(12) United States Patent
Minami et al.

(10) Patent No.: US 6,517,901 B1
(45) Date of Patent: Feb. 11, 2003

(54) PROCESS FOR DEPOSITING LAYERS BASED ON METAL OXIDE(S)

(75) Inventors: Tsutomu Minami, Osaka-Fu (JP); Kiyoharu Tadanaga, Osaka-Fu (JP)

(73) Assignee: Saint-Gobain Vitrage, Courbevoie (FR)

( * ) Notice: Subject to any disclaimer, the term of this patent is extended or adjusted under 35 U.S.C. 154(b) by 0 days.

(21) Appl. No.: 09/266,846

(22) Filed: Mar. 12, 1999

(30) Foreign Application Priority Data

Mar. 13, 1998 (FR) ............................................. 98 03152

(51) Int. Cl.⁷ ............................... B05D 3/02; B05D 3/06
(52) U.S. Cl. ........................................ 427/226; 427/510
(58) Field of Search ................................. 427/226, 510

(56) References Cited

U.S. PATENT DOCUMENTS

| | | | |
|---|---|---|---|
| 3,791,340 A | | 2/1974 | Ferrara |
| 3,964,906 A | | 6/1976 | Kenney |
| 4,505,021 A | * | 3/1985 | Hamada et al. ............... 29/570 |
| 4,590,117 A | * | 5/1986 | Taniguchi et al. .......... 359/586 |
| 5,116,643 A | * | 5/1992 | Miller et al. .......... 252/62.9 PZ |
| 5,156,884 A | * | 10/1992 | Tanitsu et al. ............... 427/558 |
| 5,424,008 A | * | 6/1995 | Hirai et al. .................. 252/500 |
| 5,605,723 A | * | 2/1997 | Ogi et al. .................... 427/533 |
| 5,680,285 A | * | 10/1997 | Nakamura et al. .......... 360/135 |
| 5,776,425 A | * | 7/1998 | Wu et al. .................... 423/618 |
| 5,776,844 A | | 7/1998 | Koch et al. |
| 5,900,275 A | * | 5/1999 | Cronin et al. ............... 427/108 |
| 6,013,334 A | * | 1/2000 | Kamisawa ................... 427/551 |
| 6,037,289 A | * | 3/2000 | Chopin et al. ................. 502/2 |

FOREIGN PATENT DOCUMENTS

| | | |
|---|---|---|
| EP | 854117 | 7/1998 |
| FR | 2 184 653 | 12/1973 |
| FR | 2 254 619 | 7/1975 |
| FR | 2 759 360 | 8/1998 |
| WO | WO 96/11887 | 4/1996 |
| WO | WO 98/40320 | 9/1998 |

OTHER PUBLICATIONS

Patent Abstracts of Japan, vol. 018, No. 004 (C–1449), Jan. 6, 1994 & JP 05247657A.
Patent Abstracts of Japan, vol. 017, No. 566 (E–1446), Oct. 13, 1993 & JP 05166423A.
Patent Abstracts of Japan, vol. 018, No. 557 (P–1817), Oct. 24, 1994 & JP 06202092A.
Patent Abstracts of Japan, vol. 095, No. 006, Jul. 31, 1995 & JP 07082526A.
Patent Abstracts of Japan, vol. 097, No. 010, Oct. 31, 1997 & JP 09157855A.

* cited by examiner

*Primary Examiner*—Shrive P. Beck
*Assistant Examiner*—Michael Cleveland
(74) *Attorney, Agent, or Firm*—Pennie & Edmonds LLP

(57) ABSTRACT

The invention is about a process for depositing via the sol-gel route a continuous or discontinuous layer based on metal oxide(s) on a substrate (1), especially a transparent substrate, which includes at least the following steps:

(a)—preparation of a sol from at least one metal precursor, at least one chelating/stabilizing agent, optionally at least one solvent and/or at least one dopant precursor, (b)—deposition of the sol as a layer on at least part of one of the faces of the substrate (1), (c)—irradiation by ultraviolet rays of at least part of the sol deposited as a layer on the substrate (1), (d)—heat treatment of at least that part of the sol which was irradiated by the ultraviolet rays.

23 Claims, 4 Drawing Sheets

(a)

(b)

(c)

PROCESS FOR DEPOSITING LAYERS BASED ON METAL OXIDE(S)

FIELD OF THE INVENTION

The invention relates to a process for depositing layers based on metal oxide(s), and more particularly those which are, at least slightly, electrically conductive. It relates more particularly to the layers which because of their intrinsic properties and their thicknesses are transparent, without, however, excluding opaque layers.

BACKGROUND OF THE INVENTION

The invention relates especially to the deposition of such layers on transparent substrates, of the glass or polymer-based organic substrate type. Many products based on transparent substrates in fact require such layers, either in the form of a continuous coating, which may be the case for example with a layer having an antistatic function, having a low level of conductivity or having a heating function, or in the form of a discontinuous coating which is etched in a given pattern. This is, for example, the case with substrates which require conducting elements/electrodes with a good or even high resolution: they may be electrodes for the glass substrates of emissive screens of the flat screen type, electrodes for photovoltaic cells or arrays of conductive elements for heated windows, windows provided with an antenna or glazing with a conductive coating having the function of a shield towards electromagnetic waves.

Many deposition techniques have already been studied for this type of layer. Thus, it is known to manufacture layers based on metal oxide or on silicon oxide via the so-called "sol-gel" process, the principle of which is like the synthesis of organic polymers and consists in forming an oxide network by polymerization of molecular precursors in solution of the metal alkoxide type, by hydrolysis and then gradual condensation at ambient temperature. A heat treatment makes it possible, in the final step, to dry and densify the layer of oxide obtained.

This process is advantageous in the sense that it is quite flexible in terms of use and is quite simple to employ. However, it includes a number of limitations. Thus, it is not always possible to obtain the optimum layer performance characteristics, for a given chemical composition. Furthermore, up until now it has been possible to obtain only continuous layers which must then be etched using an independent process if a discontinuous patterned layer is desired.

SUMMARY OF THE INVENTION

The object of the invention is therefore to remedy these drawbacks via providing an improved process for synthesizing layers based on metal oxides(s) by the sol-gel route, which especially makes it possible to obtain higher performance layers and/or layers which are either continuous or discontinuous.

The object of the invention is first of all a process for depositing via the sol-gel route a continuous or discontinuous layer based on metal oxide(s) on a substrate, especially of the transparent type. This process includes at least the following steps:

(a)—preparation of a sol from at least one metal precursor, at least one chelating/stabilizing agent, optionally at least one solvent and/or at least one dopant precursor, (b)—deposition of the sol as a layer on at least part of one of the faces of the substrate, (c)—irradiation by ultraviolet rays of at least part of the sol deposited as a layer on the substrate, (d)—heat treatment of at least that part of the sol which was irradiated by the ultraviolet rays.

The term "discontinuous" layer is understood to mean, in the sense of the invention, a layer which is obtained directly in a non-continuous form, in a given pattern, like those which are usually obtained by etching starting with a continuous layer.

For the sake of simplicity, in all the steps of the process described above only the formation and the use of a "sol" will be mentioned, using a terminology as in the field of sol-gel processes. However, it is clear for those skilled in the art that this "sol", once deposited as a layer on the substrate, is able to be converted into a gel by modification of its viscosity brought about by the reactions between the various chemical species contained in the sol.

BRIEF DESCRIPTION OF THE DRAWINGS

The invention will be described below in greater detail using non-limiting examples illustrated by the following figures.

DETAILED DESCRIPTION OF THE INVENTIONS

Figure 1:
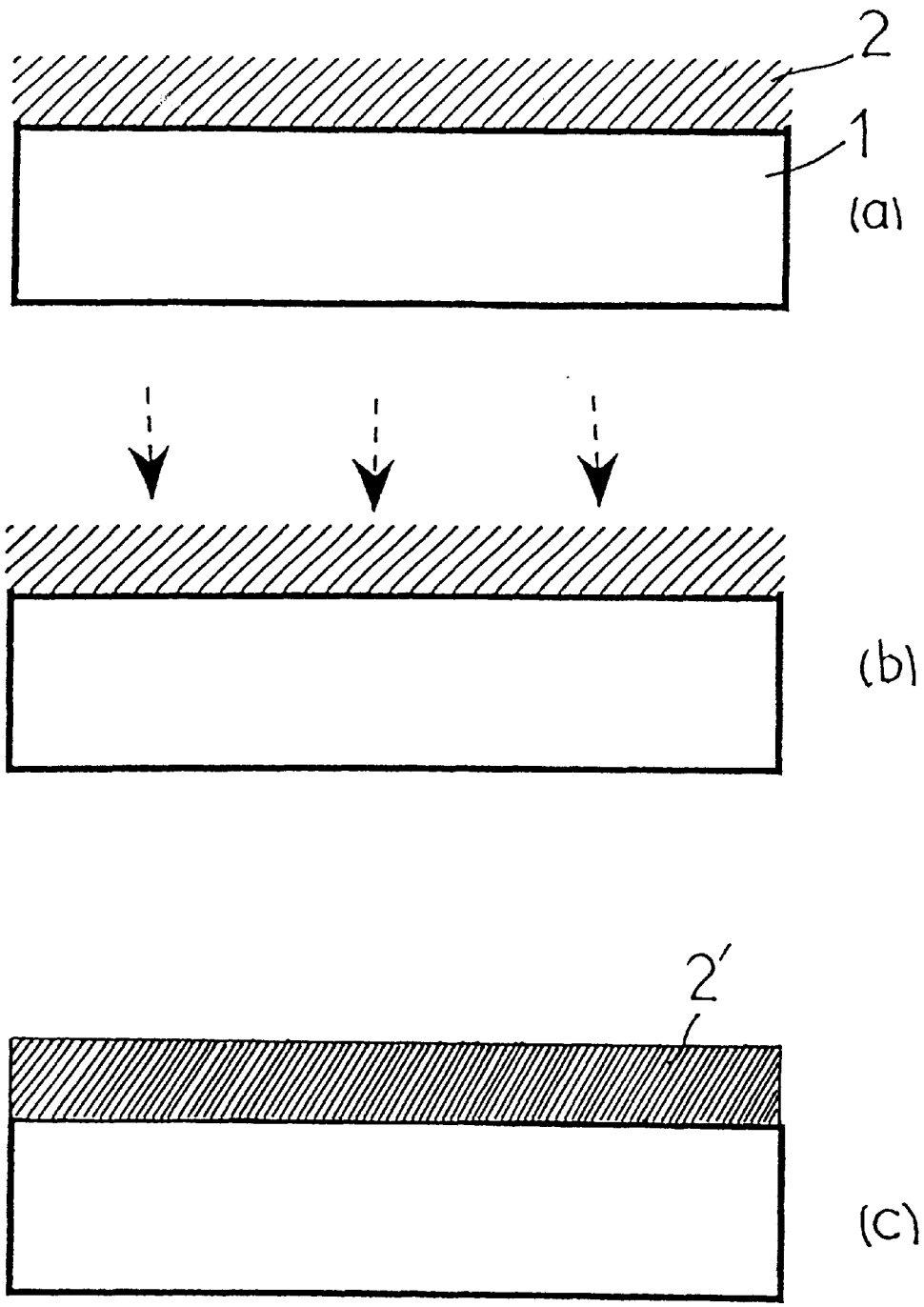
FIG. 1: a highly diagrammatic representation of the steps of a process for depositing a continuous layer according to the invention.

According to one method of implementing the process of the invention, the irradiation phase (c) is repeated n times, where $n \geq 1$.

According to another method of implementing the process, not exclusive of the first, it is the heat treatment phase (d) which is repeated p times, where $p \geq 1$.

A preferred variant thus consists in that at least the irradiation phase (c) and/or at least the heat treatment phase (d) is/are repeated once, so as to alternate irradiation phase (s) and heat treatment phase(s) (without excluding the possibility of interposing other treatment steps between the irradiation phase and the heat treatment phase). (It is also possible to carry out a heat treatment phase before the first irradiation phase (c)).

In fact, the principle of the phases (a), (b) and (d) of the process of the invention is generally found in a standard sol-gel process since this process relies on the deposition of a sol which is converted into a gel and is densified to the final oxide by heat treatment. Thus, the invention has discovered that inserting, into the process, a step of irradiating the sol layer by ultraviolet rays (hereafter denoted UV) significantly modified the manner in which the layer was synthesized: this is because it seems that the UV rays promoted destabilization of the complexes which tend to form between, on the one hand, the metal precursors and, on the other hand, the stabilizing/chelating agents contained in the sol. This destabilization would thus result in controlled prepolymerization of the metal precursors.

This unexpected influence of the UV rays has therefore been able to be exploited within the scope of the invention, especially in two different ways in order to derive benefit therefrom: if it is desired to obtain a layer based on metal oxide which is continuous, it is possible to carry out the UV irradiation phase or phases (c) and the heat treatment phase or phases (d) on the entire layer of sol. It is therefore highly advantageous then to be able better to control the polymerization of the layer by virtue of the UV, and it has thus been noted that, at least in some cases, it was possible, for a given chemical composition of sol, to improve certain final properties of the layer, especially to make it electrically more conductive. It has also been observed that the exposure to UV was able to influence the crystallization temperature of the oxide, without excessively complicating the process for manufacturing the layer.

If it is desired to obtain a discontinuous layer with a given pattern, the exposure to UV has made it possible to obtain such a layer directly, without having a posteriori to etch the layer. This is because it has proved possible, during the phase c) or at least one of the phases (c), to irradiate, with UV, the layer of sol not in its entirety but selectively in regions which will correspond to the regions of the substrate where it is desired to deposit the oxide. Thus, it is possible to prepolymerize the layer of sol in localized regions, while, in the non-irradiated regions, the metal precursors remain stabilized and essentially blocked in the form of a complex. In fact, as will be explained below, the non-irradiated regions of sol may then be removed relatively easily, leaving only the prepolymerized irradiated regions which it is then sufficient to cure thermally in a conventional manner in order to obtain the discontinuous layer with the desired pattern, determined by the selective manner in which the sol was irradiated.

This selective irradiation may be carried out in various ways. In a non-limiting manner, it is possible especially to use a source of UV rays capable of channelling the radiation, in a relative movement with respect to the substrate, the UV rays striking the substrate on its face provided with the layer of sol, or on its opposite face if it is made of an essentially UV-transparent material.

Another way of obtaining selective irradiation consists in interposing a mask between the layer of sol and the source of emission of the UV rays, here too either above the layer of sol or on the side of the opposite face of the substrate if it is UV-transparent.

The mask may be held a certain distance from the layer of sol, the UV source being oriented suitably with respect to the mask so that there is the desired projection of UV onto the layer of sol. It is therefore possible to coat for instance the mask on an U.V. transparent substrate, like a glass substrate, which is put above the sol layer, either at a given distance, or so that the non-masked side of the glass substrate be in contact with the sol layer.

The mask may also be brought into direct contact with the layer of sol, it then being preferable to pretreat the layer slightly (for example, very moderate heating) so as to give it the viscosity sufficient to support the mask uniformly.

To summarize, a selective UV irradiation phase may include the following steps (considering that the sol has already taken the consistance of a gel):

deposition on or near the layer of sol of the mask on a second glass substrate put above the gel layer, selective irradiation of the layer of gel by UV through the mask, removal of the mask, removal of the gel layer regions which were masked during the irradiation.

It goes without saying that if several selective irradiation phases are provided in the process, steps 3 and/or 4 may be carried out only during at least one of the phases, especially the last phase, and not for each of them.

The mask may be removed in various ways, depending on its chemical nature in particular. The simplest way is to remove it by peeling, using mechanical traction, if it is deposited directly on the gel layer. When it is deposited on another substrate put above the gel layer, it is enough to simply evacuate said another substrate.

The removal of the masked, non-irradiated regions may also be accomplished in various ways, especially chemically, i.e. by dissolving in a suitable, generally organic, solvent or mixture of solvents. It may also be accomplished by immersing the substrate in the bath of solvent(s), by a rinsing operation by spraying the said solvent(s) onto the layer of sol, etc. The irradiated regions themselves will rest this removal treatment since their condensation is much more pronounced.

The various chemical species which may be used in phase (a) for preparing the sol according to the invention are now described in a non-limiting manner.

The metal precursor or precursors are advantageously chosen from metal salts of the halide type, organometallic compounds and metal alkoxides. Since the invention relates more particularly to the formation of layers based on tin oxide, the following compounds may thus be mentioned: $SnCl_2$, $SnCl_4$, Sn-2-ethylhexanoate, alkoxides of formula $Sn(OR)_4$ or $SnR'(OR)_3$, here R, R' are identical or different, carbon-containing, linear or branched radicals of the alkyl type having from 1 to 6 C, such as tin tetraisoprocoxide $Sn(O—i—Pr)_4$.

The chelating/stabilizing agents are preferably chosen from suitable organic molecules, having a ketone and/or ester function, most particularly those belonging to the family of β-diketones. Examples which may be mentioned are 2,4-pentanedione, 1-phenyl-1,3-butanedione and ethyl acetoacetate.

Without a dopant, the layer of metal oxide may be insulating, behaving as a dielectric material, or slightly conductive, especially when there are oxygen vacancies in the oxide lattice. However, if it is desired to guarantee a relatively high level of electrical conduction it is necessary to dope the oxide, by adding the precursor of a dopant to the sol. This dopant may be a halogen, the halogen-carrying precursor possibly being, for example, a halogenated, especially fluorinated, organic acid such as trifluoro-acetic acid. The dopant may be a metal capable of substituting for the major metal of the metal oxide formed. If it is desired to dope a tin oxide layer, a suitable dopant metal will be chosen from Group Va of the Periodic Table, of the As or Sb type, a precursor of which may be in the form of a metal halide (for example, $SbCl_3$ or $SbCl_5$).

The optional solvent is preferably essentially organic, especially one having an alcohol function of the ethanol or isopropanol type. It can be also inorganic, for instance made of a sodium hydroxide solution or of ammonia water.

In the variant in which a mask is used to carry out selective UV irradiation of the layer of sol, the latter may be chosen to be based on a resin, of the photomask type deposited, for example, by photolithography in a known manner. The mask can also be deposited on a glass-type substrate, as mentioned above.

The sol deposition phase (b) may be carried out by any known technique making it possible o deposit layers of sol with a uniform thickness, for example within a thickness range of between 5 and 1000 nm preferably of at least 10 nm. Thus, it is possible to deposit the sol by spin coating, by dip coating, by laminar coating, by spraying, or by techniques known by the name of roller coating or meniscus coating.

The UV irradiation phase(s) (c) preferably uses (use) mainly radiation around 300 nm, in particular between 250 and 360 nm, especially with a measured light intensity on the layer of sol of about 150 mW/cm$^2$, in particular between 100 and 200 mW/cm$^2$.

The heat treatment phase(s) (d) is (are) generally carried out at least 100° C., in particular between 200 and 550° C. The temperatures may be adjusted in this range so as to be compatible with the chemical nature of the substrates, especially if they are made of glass or are based on an organic polymer.

The invention also relates to the application of the process according to the invention to the deposition of layers on transparent substrates made of glass or based on organic polymer(s), or substrates based on a ceramic or vitroceramic material, or on substrates based on silicon.

The invention also relates to the application of the process to the deposition of continuous or discontinuous layers based on optionally doped tin oxide, of the F:SnO$_2$, Sb:SnO$_2$ or As:SnO$_2$ type, or else based on tin-doped indium oxide ITO. It has thus proved to be the case that the invention lends itself particularly well to the formation of etched/patterned layers based on SnO$_2$ having electrical conduction properties. Now, hitherto, these layers were regarded as difficult to etch using conventional chemical etching techniques since these layers are known to be particularly chemically resistant. The invention also relates to a way of obtaining discontinuous SnO$_2$-based layers directly. Those layers have generally a thickness comprised between 5 and 1000 nm, notably of at least 10 nm.

Finally, the subject of the invention is the application of the process according to the invention to the manufacture of conductive elements/electrodes or antistatic coatings in various fields. This may be the glassmaking industry, for example for the purpose of manufacturing conductive arrays for heated windows using the Joule effect, or antistatic windows or windows incorporating antennae, in particular for equipping vehicles or aircraft. The process according to the invention can also be used to produce coatings having the function of a shield towards electromagnetic waves, for instance for windows of buildings located close to airports. It may also be the photovoltaic cell industry. Finally, it may be the electronics industry, for example for the purpose of manufacturing the front or rear faces of emissive screens of the flat-screen type, a screen called plasma screen, or else tactile screens, and more generally any type of screen/window. capable of receiving, transmitting or emitting radiation, in particular visible light.

The invention also relates to the substrate which has been described above, and which is characterized by a layer which is continuous or discontinuous/etched, which comprises metallic oxide(s) and which has been obtained via a sol-gel route according to she above described process.

This substrate can also have additional thin films. According to a preferred embodiment, the substrate has at least another thin film, notably made of a dielectric material (for example metallic oxides(s) like TiO$_2$, ZrO$_2$ or oxide, oxicarbide, oxinitride or nitride of silicon). Said thin film(s) are located below the layer according to the invention. This "sub-layer(s)" is preferably also obtained via a sol-gel route, without excluding other deposition techniques (vacuum deposition like cathodic sputtering, CVD, . . . ). It can have a geometric thickness comprised between 10 and 150 nm, notably 15 and 80 nm or 40 and 70 nm and can fulfill, depending on its chemical nature and its thickness, different roles (a barrier toward alkaline elements from the glass substrate, a layer having an optical or an anchoring role, . . . ). It is preferably continuous, but may be etched also.

Substrates used will be specified according to each of the examples: they are either standard silica-soda-lime float glass substrates or alkali-free glass substrates of the type sold by Corning under the reference 7059, or SiO$_2$ or silicon substrates.

Other glass compositions which are also suitable, especially for applications in the electronics field, are, for example, described in Patents WO96/11887, WO98/40320 and EP-854 117.

All the examples relate to the deposition of layers base on oxide which are either not doped or are doped with fluorine or antimony, this being specified in each case, and having a thickness of approximately 100 nm (between 10 and 1000 nm).

Figure 2:
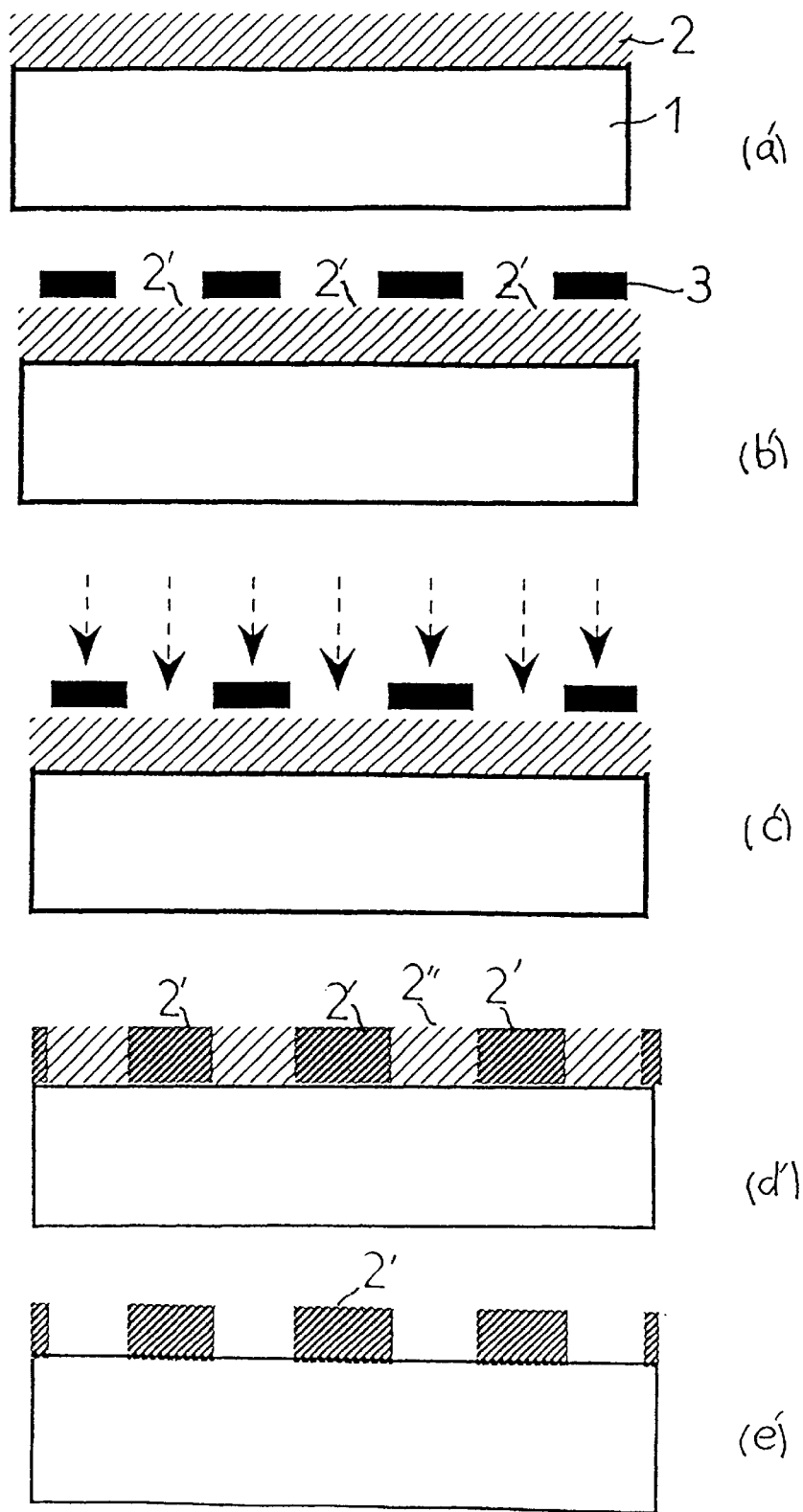
FIG. 2: a highly diagrammatic representation of the steps of a process for depositing a discontinuous layer according to the invention.

The main steps of the two sol-gel deposition processes according to the invention are shown diagrammatically in FIGS. 1 and 2, FIG. 1 referring to the deposition of a continuous layer, FIG. 2 referring to the deposition of a discontinuous layer.

According to FIG. 1:

in a first step (a), the substrate 1 is provided with a regular uniform layer of sol 2, the composition of which will be specified in the examples and which comprises at least one tin precursor and one agent for chelating the latter in order to stabilize it and to avoid too rapid and uncontrolled a reaction between the metal precursor molecules. The sol has a gel consistency, by drying, and the gel layer hardens, according to a step (b), the entire layer 2 is exposed to UV radiation which destabilizes the complexes formed in a kind of photolysis, Reading to rapid prepolymerization of the layer by chain reactions between the metal precursors, the layer thus polymerized 2' must then be subjected, in a step (c), to a heat treatment intended to complete its densification in order to keep only an inorganic metal oxide structure.

According to FIG. 2, a layer based on tin oxide is obtained directly with a given pattern:

step (a') consists, as previously, in depositing a regular layer of sol 2 on the substrate 1, step (b') then consists in depositing a resin-based mask 3 by photolithography in contact with the layer 2, the viscosity of which was adjusted beforehand in a suitable manner, step (c') consists in irradiating the layer 2+mask 3 assembly with UV rays. Since the mask 3 filters the UV, only the regions 2' arc actually exposed to the UV and "prepolymerize" under the effect of the radiation, step (d') consists in removing the mask 3, for example by peeling, thus exposing the regions 2" of the layer 2 which were not irradiated and which therefore have not been densified, prepolymerized like the regions 2', step (e') consists in removing the non-irradiated regions 2", which may be obtained by simply rinsing the substrate 1 with a suitable organic solvent, notably a solvent with alcohol functions, or with an inorganic solvent, made of a sodium hydroxide solution or ammonia water, a final step, not shown, consists in heat treating the remaining regions 2' so as to complete their densification to metal oxide. An etched layer with a pattern corresponding to that provided by the mask 3 is therefore obtained directly.

Figure 3:
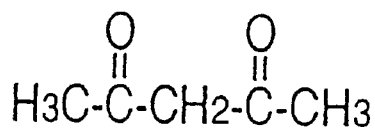
FIG. 3: the chemical structures of chelating agents for the metal precursors of the sol, and an example of a metal precursor/chelating agent complex.
Figure 3:
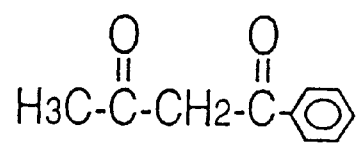
Figure 3:
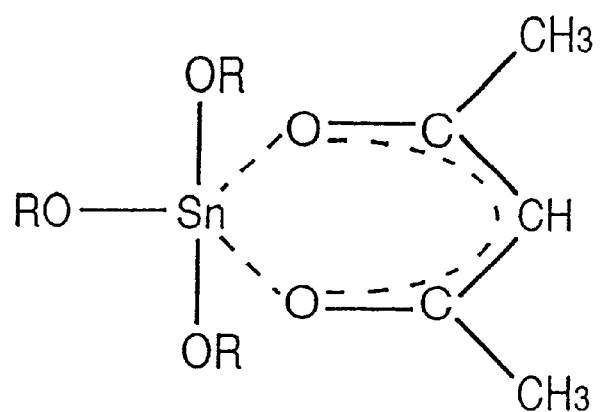

A first series of Example 1 to 5 uses a sol with tin tetraisopropylate as metal precursor. The preparation of the sols takes place in the following manner:

the tin tetraisopropylate ($Sn(O—iPr)_4$) is dissolved in a solvent, isopropanol, i—PrOH, a chelating agent for the tin precursor is added to the solution, namely, depending on the examples, 2,4-pentadione, also called acetylacetone (AcAc) and shown in the FIG. 3(a), or 1-phenyl-1,3-butanedione, also called benzoylacetone (BzAc) and shown in FIG. 3(b), next, the viscosity of the sol is adjusted by adding isopropanol and water, $H_2O$, in order to obtain the sol.

The chelating agent stabilizes the tin tetraisopropylate. Thus, acetylacetone forms bonds with the tin, by substitution reactions of an alkoxy group of the tin alkoxide in order to form the complex shown in FIG. 3.

Table 1 below indicates, for each of the five examples, the precise composition of the sols, expressed in moles per mole of tin precursor.

|  | $Sn(O-iPr)_4$ | i-PrOH | AcAc | BzAc | $H_2O$ |
|---|---|---|---|---|---|
| Example 1 | 1 | 30 | 1 |  |  |
| Example 2 | 1 | 30 | 2 |  |  |
| Example 3 | 1 | 30 | 1 |  | 2 |
| Example 4 | 1 | 30 | 2 |  | 2 |
| Example 5 | 1 | 50 |  | 1 | 2 |

A second series of Examples 6 to 9 uses a so with tin dichloride $SnCl_2$ as tin precursor. The preparation of the sols is carried out in the following manner:

for Examples 6 to 9, a mixture of $SnCl_2$ and acetylacetone is prepared in a 1/20 molar ratio, and then either nothing is added (Example 6) or a dopant is added (Examples 7, 8, 9), namely $CF_3COOH$ in the case of Example 7, $SbCl_3$ in the case of Example 8 and $SbCl_5$ in the case of Example 9, with a dopant/$SnCl_2$ molar ratio of 0.1, for Example 10, a $SnCl_2$+ ethanol mixture is prepared with a 1/20 molar ratio, and then a $SbCl_3$ dopant in ethanol is added ($SbCl_3/SnCl_2$ molar ratio of 0.06). Finally, acetylacetone in ethanol is added, with a AcAc/$SnCl_2$ molar ratio of 0.4.

The sols prepared according to Examples 1 to 5 are employed in the following manner:

the substrates used are $SiO_2$ substrates having the dimensions of 20 mm×20 mm and a thickness of 1 mm, each of the five sols are deposited as a thin layer of approximately 20 to 500 nm in thickness on the glasses using a dip-coating technique, with rate of removal from the glass out of the sol bath of approximately 0.20 or 0.4 mm/s, five substrates are obtained which are provided with five layers of sol which rapidly assumes the consistency of a gel, next, the five glasses are exposed to UV irradiation having a wavelength of 250–360 nm, with a light intensity on the films of gel of approximately 150 mW/$cm^2$, next, the five glasses are heat treated at temperatures of between 100 and 600° C. in order to complete the conversion of the gels as a layer of tin oxide.

Figure 4:
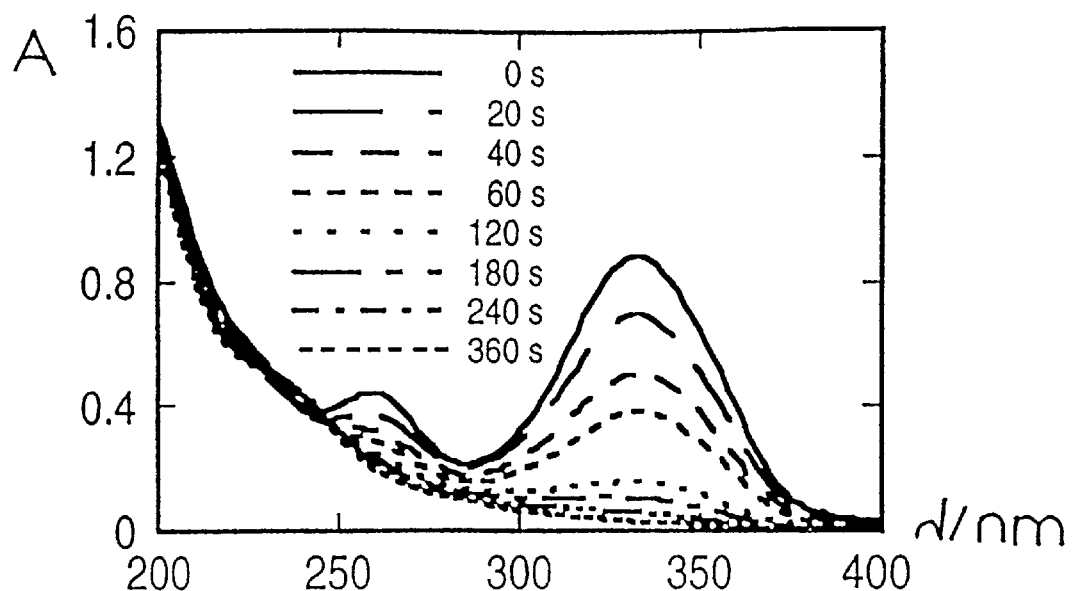
FIG. 4: the UV/visible absorption spectrum of the layer of the sol during its irradiation with UV.

FIG. 4 shows the gradual modification of the absorption in the visible and in the UV of the layer of gel during the step of exposing the layer of gel according to Example 5 to UV: the absorption band initially observed around 335 nm (which corresponds to $\pi$-$\pi$* transitions in the complex formed by Sn(—O—iPr) and BzAc) decreases strongly in intensity and almost completely disappears after 360 seconds of irradiation. The complexes are therefore fully destabilized by the UV and disappear in a few minutes. The thickness of the gels decreases by approximately 30% during the UV irradiation.

Table 2 below indicates, in the case of Example 3, the values of electrical conductivity σ(UV) in S/cm of the $SnO_2$ layers obtained as a function of the temperatures T (° C.) used to carry out the final step of the heat treatment. (An Example 3' was produced in a similar way to Example 3, but on the Corning glass substrate referenced above).

| EXAMPLE 3 | T | σ |
|---|---|---|
|  | 100 | $0.9 \times 10^{-5}$ |
|  | 200 | $5.0 \times 10^{-5}$ |
|  | 300 | $2.0 \times 10^{-5}$ |
|  | 400 | $7.0 \times 10^{-2}$ |
|  | 500 | $1.8 \times 10^0$ |
|  | 600 | $4.4 \times 10^0$ |
| EXAMPLE 3' | 450 | $5.0 \times 10^1$ |

In Examples 1a to 5a, the same sols as in Examples 1 to 5 are used, but on silicon substrates. Before exposing the gels to UV, they are licitly cured by drying at around 50–100° C. for a few minutes and a glass substrate coated with a mask is deposited or their surface. The mask is sold by the company Edmund Scientific Company under the name "test target USAF 1951". It is the form of parallel bands approximately 10 to 20 μm in width and spaced apart from each other by a distance of, for example, 20 to 50 μm. (Predrying the gels enables them to reach a sufficient viscosity of approximately $10^5$ Pa.s).

Figure 5:
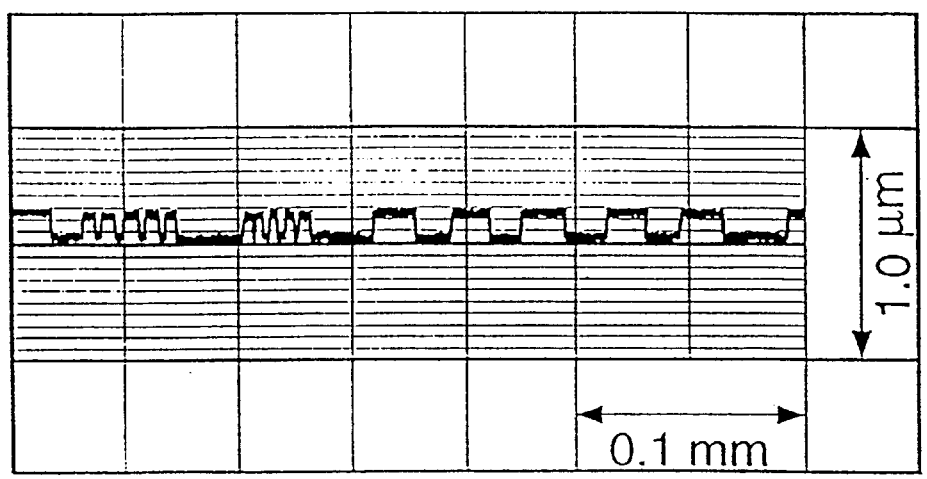
FIG. 5: the profile of a discontinuous $SnO_2$-based layer obtained according to the invention.

Layers are obtained which reproduce, over a thickness of approximately 100 nm, the pattern of the mask with a very high resolution. This may be seen in FIG. 5, which shows, for one of these examples, the profile of the layer obtained, measured by a surface profilometer.

The sols prepared according to Examples 6 to 9 are employed in the following manner:

the substrates used are Corning glasses referenced above, one layer of each of the sols per substrate is deposited by spin coating, UV irradiation is carried out, as previously for Examples 1 to 5, for 10 minutes, next, a heat treatment of approximately 5 minutes, as previously, is carried out at temperatures of between 350 and 550° C., this is repeated 4 times by alternating the "UV" irradiation conditions and the heat treatments, terminating in a heat treatment for 1 hour at the same temperature as above, finally, the resistivity of the final layers are measured with two silver electrodes.

Table 3 summarizes, for each of the examples, the nature of the layer, the heat-treatment temperatures T (° C.) and the corresponding resistivity ρ in (Ω·cm):

| T | 350 | 400 | 450 | 500 | 550 |
|---|---|---|---|---|---|
| Example 6 SnO | 1.2 | $2.6 \times 10^{-2}$ | $2.0 \times 10^{-2}$ | $2.3 \times 10^{-}$ | |
| Example 7 $SnO_2$ (F) | | 2.4 | $7.0 \times 10^{-2}$ | $2.9 \times 10^{-}$ | $2.5 \times 10^{-2}$ |
| Example 8 $SnO_2$ ($Sb^{H1}$) | | | $1.1 \times 10^{-1}$ | $3.5 \times 10^{-}$ | $6.8 \times 10^{-1}$ |
| Example 9 $SnO_2$ ($Sb^H$) | | | 5.1 | $1.6 \times 10^{-}$ | $7.0 \times 10^{-2}$ |

The sol prepared according to Example 10 was deposited on a glass substrate of the Corning type by spin coating three times with, after each deposition, a short heat treatment. Next, it was exposed to UV irradiation for 10 minutes, as previously, and then a final heat treatment of one hour at temperatures of from 350 to 550° C. The layers obtained have a resistivity of between $1.5 \times 10^{-2}$ and $8 \times 10^{-3}$ $\Omega \cdot cm$ depending on the treatment temperature, the lowest resistivity being obtained around 450° C.

Examples 6 to 10 may be repeated, using this time the mask as for Examples 1a to 5a in order to obtained patterned layers.

In conclusion, the invention has developed a novel type of synthesis of layers via the sol-gel route, which, involving UV treatments, makes it possible to control their manufacture better and to etch in situ, during their actual formation, $SnO_2$-based layers nevertheless known for their high hardness.

What is claimed is:

1. Process for depositing via the sol-gel route a discontinuous electrically conductive layer based on metal oxide(s) on a substrate having multiple faces comprising:
   (a) preparing a sol from at least one metal precursor, at least one chelating/stabilizing agent, at least one solvent and/or at least one dopant precursor,
   (b) depositing the sol as a layer on at least part of one of the faces of the substrate,
   (c) interposing a mask that covers at least a part of the sol layer between the sol layer and an ultraviolet ray emission source,
   (d) irradiating a first time with ultraviolet rays the part of the sol layer not covered by the mask,
   (e) heat treating a first time at least that part of the sol layer which was irradiated by the ultraviolet rays,
   (f) further irradiating with ultraviolet rays the part of the sol layer not covered by the mask, and
   (g) further heat treating at least that part of the sol layer which was irradiated by the ultraviolet rays,
   wherein the irradiating and the heat treatment steps are alternated.

2. Process according to claim 1, wherein the further irradiating and heat treatment steps (f) and (g) are done n times, where $n \geq 2$.

3. Process according to claim 1, wherein at least one of the irradiating steps comprises the following steps:
   irradiating with ultraviolet radiation the layer of sol through the said mask,
   removing the mask, and
   removing sol layer regions which were masked during at least one of the irradiating steps.

4. Process according to claim 1, wherein the at least one metal precursor is chosen from metal halide salts, organometallic compounds and metal alkoxides.

5. Process according to claim 4, wherein the at least one metal precursors are tin precursors in the form of $SnCl_2$, $SnCl_4$, Sn-2-ethylhexanoate, $Sn(OR)_4$ or $SnR'(OR)_3$, where R and R' are carbon-containing radicals.

6. Process according to claim 1, wherein the chelating/stabilizing agent is chosen from organic molecules having at least one of a ketone or ester function.

7. Process according to claim 6, wherein the chelating/stabilizing agent(s) comprise 2,4-pentanedione, 1-phenyl-1,3-butanedione, or ethyl acetoacetate.

8. Process according to claim 1, wherein the dopant precursor is chosen from fluorinated organic acids or from metal halides.

9. Process according to claim 8, wherein the fluorinated organic acid comprises trifluoroacetic acid, or the metal halide comprises $SbCl_3$ or $SbCl_5$.

10. Process according to claim 1, wherein the mask is a resin deposited by photolithography or is deposited on a glass substrate.

11. Process according to claim 1, wherein the sol is deposited by spin coating, dip coating, laminar coating or spraying.

12. Process according to claim 1, wherein the irradiating step uses radiation of from 250 to 360 nm.

13. Process according to claim 12, wherein the intensity of the radiation at the layer of sol is from 100 to 200 $mW/cm^2$.

14. Process according to claim 1, wherein the heat treating steps are carried out at a temperature of at least 100° C.

15. Process according to claims 14, wherein the heat treating step is carried out at a temperature from 200° C. to 550° C.

16. Process according to claim 1, wherein the transparent substrate is a glass substrate, an organic polymer substrate, a ceramic substrate, a vitroceramic substrate, or a substrate comprising silicon.

17. Process according to claim 1, wherein the discontinuous layer is based on tin oxide, or doped tin oxide.

18. Process according to claim 17, wherein the tin oxide is doped with fluorine, arsenic, or antimony.

19. Process according to claim 1, wherein said layer is deposited on conducting elements/electrodes or as an antistatic coating.

20. Process according to claim 1, wherein the layer comprises tin-doped indium oxide.

21. Process according to claim 1, wherein the heat treating steps are carried out at a temperature of from 200° C. to 550° C.

22. Process according to claim 1, wherein the solvent is an organic solvent that comprises ethanol or isopropanol.

23. Process according to claim 1, wherein the solvent is an inorganic solvent that comprises a sodium hydroxide solution or a solution of ammonia in water.

* * * * *